Dec. 13, 1966   J. A. VICTOR   3,292,025
DYNAMOELECTRIC MACHINE ROTOR END WINDING
Filed May 15, 1964
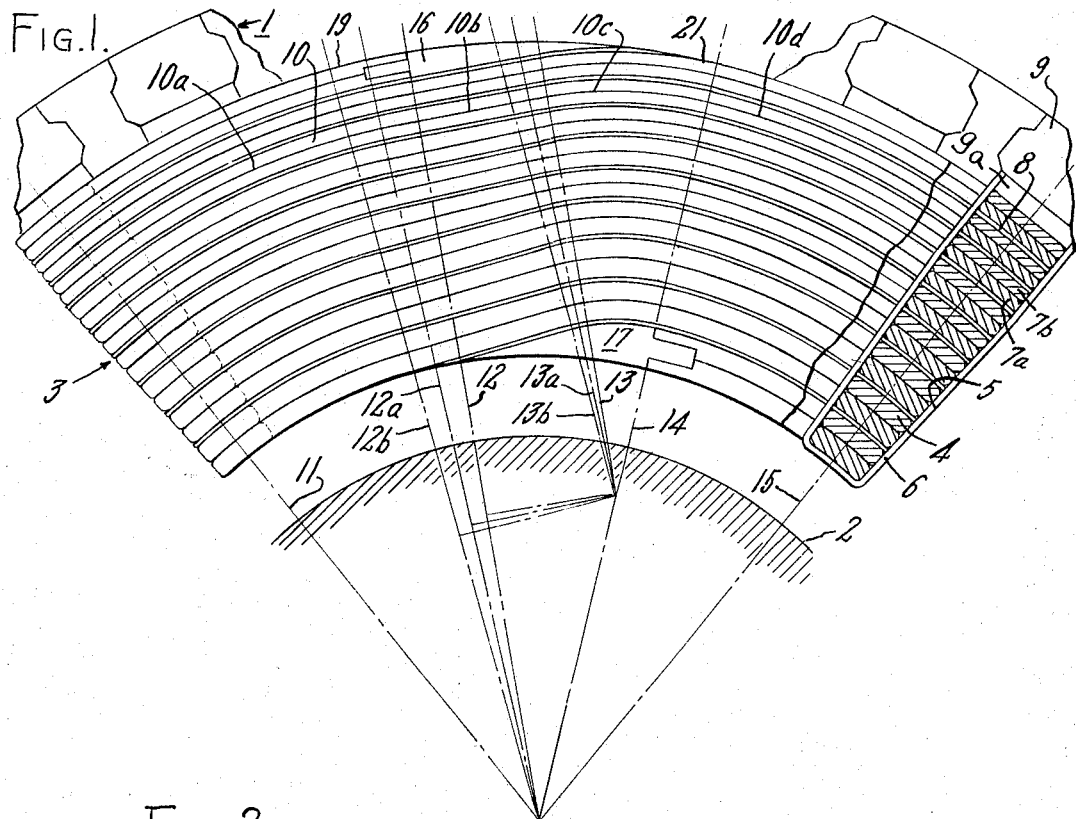
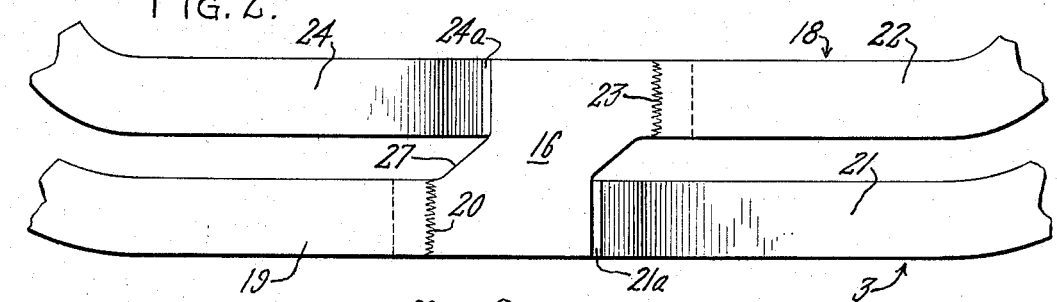
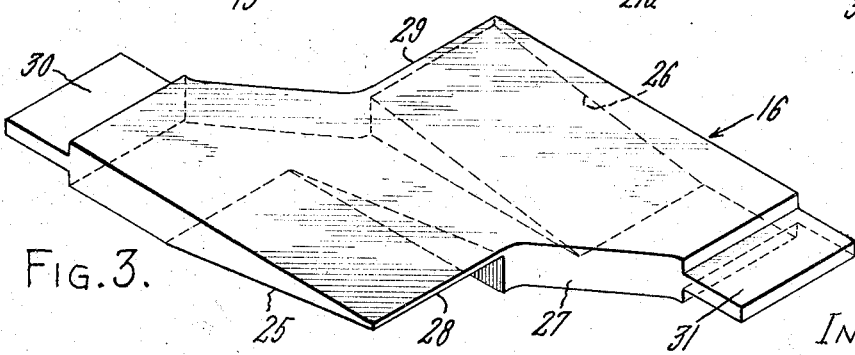
INVENTOR
JOSEPH A. VICTOR
BY W. C. Crutcher
HIS ATTORNEY

United States Patent Office 3,292,025
Patented Dec. 13, 1966

3,292,025
DYNAMOELECTRIC MACHINE ROTOR END WINDING
Joseph A. Victor, Scotia, N.Y., assignor to General Electric Company, a corporation of New York
Filed May 15, 1964, Ser. No. 367,825
5 Claims. (Cl. 310—208)

This invention relates to an improved arrangement for a dynamoelectric machine rotor end winding, and more particularly, it relates to an improved arrangement for the circumferentially extending portion of the end turns of the coils and for the connection between coils of the winding.

In a dynamoelectric machine rotor winding, such as the field winding for a large turbine-generator, the coils are wound in the form of radially stacked turns consisting of lightly insulated, longitudinally extending conductors disposed in a pair of longitudinal slots connected together by circumferentially extending conductors outside of the slots. The longitudinal and circumferential conductors may be made up of a continuous strip bent to the proper shape, or may consist of separate pieces brazed or otherwise connected during assembly.

In many present-day constructions, the coils are wound alternately from top to bottom and then from bottom to top in the slots. By this means, the last conductor of one coil is at the same radial height as the first conductor of the succeeding coil. Thus, coil-to-coil connections are usually made by employing a strap connecting the top conductors of two adjacent coils and then a strap connecting bottom conductors of the next two adjacent coils, and so forth.

Since the turns are electrically connected in series, provisions must be made at one end of the rotor to make the transition in radial distance (measured from the rotor axis) from each turn to the next. In the past, this has often required the equivalent radial thickness of one extra conductor, i.e., one conductor more than the number of conductors in the slot, extending over a major portion of the circumferentially extending end turns on one end of the rotor. The extra space caused by overlapping conductors is often filled with electrically inactive material, such as insulating filler blocks or inactive copper in order to provide a smooth layer-to-layer transition for the conductors.

As generators have become larger, the space in the end turn region has become more congested. At the same time, conductors have become radially thicker, often on the order of ¾ inch in thickness, or more. With present tehcniques of cooling dynamoelectric machine rotors, it is desirable to have as much space as possible under the circumferential portions of the end turns to admit coolant. Therefore, the space required by the extra conductor thickness at one end of the rotor is undesirable.

Accordingly, one object of the present invention is to provide an end winding arrangement for a dynamoelectric machine rotor which increases available space below the end windings.

Another object of the invention is to provide an improved arrangement for a rotor end winding which does not employ extra turns or overlapping turns at the end of the rotor where transition from one turn to the next turn is required.

Still another object of the invention is to provide an improved geometry for the circumferentially extending portions of a rotor end winding at the end of the rotor where a turn-to-turn transition is required.

Yet another object of the invention is to provide an improved coil-to-coil connector for use in the end winding arrangement described.

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the acompanying drawing in which:

FIG. 1 is a cross-section through the rotor axis showing an end view of the circumferentially extending portions of one coil of a dynamoelectric machine winding, FIG. 2 is a developed plan view showing the coil-to-coil connection between two coils, and FIG.3 is a perspective view of the connector shown in FIG. 2.

Briefly stated, the invention is practiced by employing a special configuration of the conductors in the end turn region, which consists of a substantially straight conductor portion joining a conductor portion which has a short radius of curvature. This configuration allows the radial transition between coil turns to be made. As special coil-to-coil connector is employed which effectively utilizes this special geometry in the end winding so as to remove the necessity for an overlapping or extra conductor layer.

Referring now to FIG. 1 of the drawing, a fragmentary view is shown of a generator rotor 1 showing a section through the spindle 2 of the rotor and an end view of one coil 3 of the end winding. The winding consists of conductors 4 disposed in slots 5 surrounded by a sheath of ground insulation 6. Each turn of the winding shown is composed of a pair of electrically-contacting conductors such as 7a, 7b, which are considered together as a unit and separated from the next pair by turn insulation 8. Of course the use of the pair 7a, 7b is only shown by way of example. A single conductor could be used for each turn, or alternately 3 or 4 conductors might be used per turn. The conductors 4 are held in the slots 5 by any suitable means such as wedges 9, which are insulated from the winding by "creepage" block 9a. The general configuration of a rotor winding typical of the prior art may be seen by reference to U.S. Patent 3,176,176 issued to D. M. Willyoung on March 30, 1965.

In accordance with the invention, the circumferentially extending portions of each conductor in a particular turn are formed as follows. Taking a typical conductor 10, it will be observed that, starting from the left in FIG. 1, the first portion of the conductor consists of an arcuate portion 10a extending over a first arc between lines 11 and 12 and having a radius taken from the axis of the rotor spindle 2. The next portion of the conductor 10 is a straight or substantially straight portion 10b extending from line 12 to line 13. The next portion of circumferential conductor 10 is the arcuate portion 10c which is drawn through an arc from line 13 to line 14. The center for the arc of portion 10c is located so that its radius of curvature is much less than that of portion 10a as will be apparent from the drawing. The final section is another arcuate portion 10d extending from line 14 to line 15 and having the same center of curvature as did the starting arcuate portion 10a but having a radius which is greater than that of portion 10a by the radial thickness of one conductor. The geometry is such that the lines describing portions 10a and 10b are tangent where they intersect line 12; similarly the lines describing portions 10b, 10c are tangent at line 13 and the lines describing portions 10c, 10d are tangent at line 14.

It will be observed that the length of the straight portion 10b is such as to cause the conductor 10 to shift radially outward by approximately one conductor thickness, whereupon the function of the short radius of curvature portion 10c is to then adjust the direction of the conductor so that it falls along an arc taken from the rotor axis, but one layer farther out.

The transition section (consisting of the conductor portions 10b and 10c) is here shown located midway between the two conductor portions 10a and 10d at the midpoint of the coil end turn. However, the transition section could be shifted in either direction and could commence near the coil corner if desired.

At the midpoint of coil 3, special connectors are employed to connect the typical coil 3 to the adjacent inlying coil and the adjacent outlying coil. One of these is seen as the top-to-top connector 16 which is connected to the inlying coil beyond coil 3 in the drawing (see FIG. 2), and the other is a bottom-to-bottom connector 17 which is connected to the adjacent outlying coil (not shown). It should be noted that the transition sections of the adjacent inlying and outlying coils alternate in so far as the arrangement of the straight portions 10b and the short radius of curvature portions 10c are concerned. For example, in the coils on either side of coil 3, the straight portions similar to 10b would be disposed to the right; while the short radius of curvature portions similar to 10c would be on the left.

The connectors 16, 17 are machined or otherwise formed to have a special shape which allows them to connect terminating ends of the coils at the top and bottom of the transition sections without requiring an extra turn thickness. The shape by which this is possible depends on the alternating configuration of the transition sections of adjacent coils.

For example, FIG. 2 is a developed plan view showing the top-to-top connector 16 connecting coil 3 with an adjacent inlying coil 18. It will be observed from FIGS. 1 and 2 that the terminating end of the conductor 19 is attached to connector 16 by a rabbeted and brazed joint indicated at 20. The next conductor 21 lies below or radially inward of conductor 19 on the left, but makes a radial transition as it passes below connector 16 and emerges on the right side at the same radius as was occupied by conductor 19 on the left.

Referring to FIG. 2, the inlying coil 18 is wound clockwise from bottom of the slot to the top of the slot. The transition section is of opposite symmetry in so far as the straight and short radius of curvature portions are concerned. For example, the top conductor 22 on the right is attached to connector 16 at joint 23. The conductor 24, when on the left, is at the same radial distance from the rotor axis as conductor 22, but it passes below the connector 16 to lie immediately below conductor 22 on the right, as previously described.

Although the shape and size of the top-to-top connectors 16 varies slightly from that of the bottom-to-bottom connectors 17, the general configuration is the same and is illustrated by reference to the perspective view of the top-to-top connector 16 shown in FIG. 3 of the drawing. The connector 16 is illustrated as it appears before it is bent to the form shown in FIG. 1. Briefly, it consists of two wedge-shaped portions 25 and 26 connected together by a central portion 27. The wedge-shaped portions 25 and 26 are oriented so that the beveled edges 28, 29 respectively face in opposite directions. Wedge portions 25, 26 are disposed so as to be transversely spaced from one another, but are longitudinally offset. The other ends of the wedge portions designated by reference numerals 30, 31, are a full conductor thickness and are provided with rabbeting tongues, or any other desired type of interlock for ease of making the brazed joints referred to previously. The central connector portion 27 is a full conductor thickness and holds the wedge-shaped portions in proper orientation as well as carrying current from one coil to the next.

It will be observed that by facing the wedge portions 25, 26 in opposite directions and further offsetting them from one another by means of the central section 27, the joints 20, 23 are circumferentially spaced from one another for a sufficient distance so that the transition can take place. In other words, the total arc occupied by the connector itself extends over the full transition section.

For ease of manufacture, the connector 16 is machined as shown in FIG. 3 out of flat stock, and is then bent to the proper curvature in a die or by forming on the coil itself as it is attached. Connector 17 is similarly machined out of flat stock, but is bent in the opposite direction from connector 16 so that the flat surface will be concave, as will be apparent from the drawing.

Inasmuch as the winding shown uses conductors of three different radial thicknesses, it is necessary, as illustrated in FIG. 1, to use different arc lengths or segment lengths for each of the three groups of turn layers, since the points of tangency are different. As illustrated in the figure, a radially intermediate group of medium thickness conductors is formed using lines 12a, 13a in lieu of 12, 13; similarly a radially inner group of thick conductors is formed using lines 12b, 13b.

Thus it will be seen that by employing a transition section in the circumferentially extending end turns which utilizes substantially straight conductor portions coupled with arcuate portions having a short radius of curvature, and by alternating the symmetry of the transition sections from each coil to the next, the special connectors employing oppositely directed wedge-shaped portions can be utilized to connect the coils so that there is no overlap or protrusion necessary. An extra conductor thickness is not required as has been the case with previous constructions.

It will be appreciated that some curves are known which closely approximate the combination of a straight line segment and a connecting tangent arcuate segment. Therefore, it is desired that the recitation of a straight segment and a short radius of curvature segment include equivalent curves which approximate this combination. However, it will be found that for ease of precalculating the proper shapes and lengths of the conductors, constant radius arcs for portions 10a, 10c, 10d and a straight portion 10b will provide simpler calculations. Also the shapes can be more easily calculated by a computer-controlled manufacturing system using arcs and straight lines rather than more complex curves.

Other modifications of the invention will occur to those skilled in the art, and it is desired to cover in the appended claims all such modifications as fall within the true spirit and scope of the invention.

What I claim as new and desire to secure by Letters Patent of the United States is:

1. A dynamoelectric machine rotor winding comprising a plurality of coils having radially stacked turns including circumferentially extending end turn conductors, said conductors on one end of the rotor including a transition section for each coil wherein the conductors change radial distance from the rotor axis from one turn to the next the conductors in said transition section each comprising a substantially straight portion and an adjacent short radius of curvature portion connecting a circumferentially extending conductor of one turn to a conductor of the next radially outer turn, and connector means extending between the transition sections and connecting said coils in electrical series.

2. A dynamoelectric machine rotor winding comprising a plurality of coils having radially stacked turns including circumferentially extending end turn conductors, said conductors on one end of the rotor being formed to provide a first arcuate portion at a first constant radius taken from the rotor axis, a circumferentially spaced second arcuate portion at a second constant radius taken from the rotor axis, said circumferentially spaced conductor portions being connected by a substantially straight conductor portion and an adjacent short radius of curvature conductor portion providing a radial transition between said arcuate portions at the first and second radii.

3. A dynamoelectric machine rotor winding comprising first and second adjacent coils having radially stacked turns including circumferentially extending end turn conductors; said conductors in said first and second coils on one end of the rotor including first and second transition sections respectively, wherein the conductors change radial distance from the rotor axis from one turn to the next, the conductors in said transition sections each comprising a substantially straight portion and an adjacent short radius of curvature portion connecting a circumferentially extending conductor of one turn to a conductor of the next radially outer turn; and a coil-to-coil connector electrically connecting the terminating conductors of the first and second coils and defining two oppositely directed wedge-shaped portions circumferentially offset from one another and each connected to a terminating conductor of one of the respective coils.

4. The combination according to claim 1 wherein each of said connector means comprises a conductive member having first and second transversely spaced longitudinally offset wedge-shaped portions disposed with the wedges extending in opposite longitudinal directions; and a central portion connecting adjacent sides of the first and second wedge-shaped portions, one end of each of the wedge-shaped portions being adapted for connecting to conductors of two adjacent coils.

5. A dynamoelectric machine rotor winding comprising a plurality of coils having radially stacked turns including circumferentially extending end turn conductors, said coils on one end of the rotor being provided with transition sections, wherein the conductors change radial distance from the rotor axis from one turn to the next, the conductors in said transition sections each comprising a substantially straight portion and an adjacent short radius of curvature portion connecting a circumferentially extending conductor of one turn to a circumferentially extending conductor of the next radially outward turn; said plurality of coils being connected by a plurality of alternating top-to-top and bottom-to-bottom connectors, each of said connectors comprising conductive members defining first and second oppositely directed wedge portions circumferentially offset from one another to extend over said transition sections and a central portion connecting the sides of said wedge portions to one another, said connector wedge portions and central portion being curved to substantially occupy only one layer among said circumferentially extending end turn conductors.

No references cited.

MILTON O. HIRSHFIELD, *Primary Examiner.*

J. W. GIBBS, *Assistant Examiner.*